March 17, 1970     P. TANGUY ET AL     3,500,742
CODED FOOD PACKAGES AND DEVICE PERMITTING TO COOK SAID
PACKAGES ACCORDING TO CODED INFORMATION THEREON
Filed Dec. 14, 1967     5 Sheets-Sheet 1

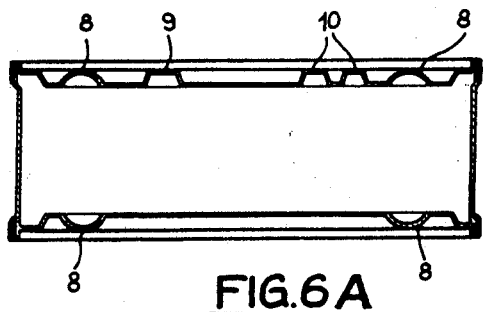
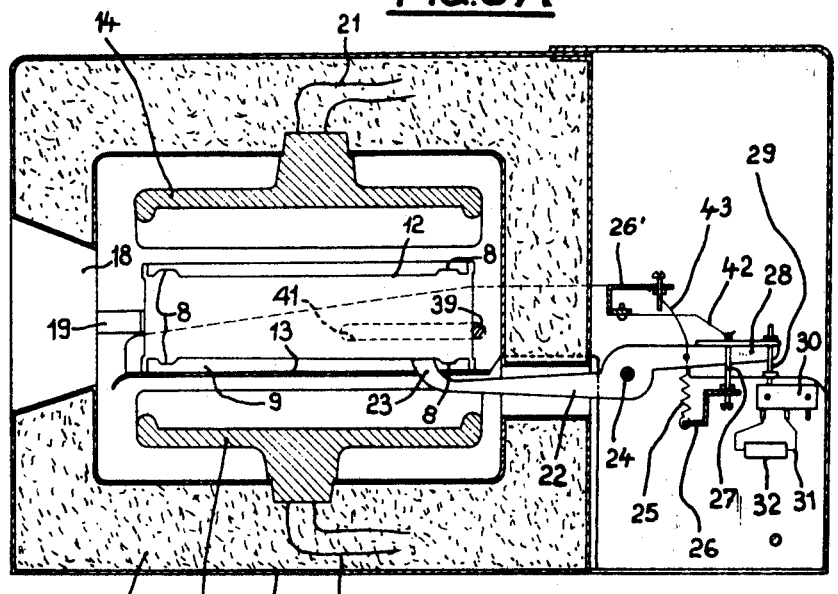

United States Patent Office
3,500,742
Patented Mar. 17, 1970

3,500,742
CODED FOOD PACKAGES AND DEVICE PERMITTING TO COOK SAID PACKAGES ACCORDING TO CODED INFORMATION THEREON
Pierre Tanguy, Pierre Carré, and Jean Le Boulbouech, all of 2 Rue Bodelio, Lorient, France
Filed Dec. 14, 1967, Ser. No. 690,470
Claims priority, application France, Dec. 15, 1966, 2,270
Int. Cl. A23b *1/06;* A47j *27/62;* F24c *7/08*
U.S. Cl. 99—326     10 Claims

ABSTRACT OF THE DISCLOSURE

Food packages are provided with coded information in the form of irregularities on their surfaces or edges and a heating device is actuated, adjusted and timed by feelers which read the code. Heating and timing circuits are actuated by the feelers in accordance with whether or not they contact the surface irregularities of the package.

---

Devices to heat food, such as ovens and ranges, generally have a certain number of control elements, either for the intensity of the heat or for its duration, which the user can adjust as he likes according to the dishes to be cooked. This adjustment is sometimes very delicate, and sometimes must be varied during their heating of the food and the user may not be familiar with it. In instances where the food is contained in cans or in frozen containers, the time duration for heating over steam or for thawing is generally even less known by users.

The purpose of the present invention is to free the user from the burden of adjusting the intensity and the duration of the heating, these factors being adjusted by the package itself upon its introduction into the heating device of the present invention.

The invention relates to a device intended to ensure the proper heating of food contained in packages, wherein the packages have a code in the form of irregularities on their surfaces or their edges. The heating device is actuated, its heat output adjusted in intensity, and the heating period timed by feeler members reading the code and, according to whether they come or do not come in contact with the above mentioned irregularities actuate or do not actuate all or part of the elements constituting the heating and timing circuits.

The invention will be better understood by reading the following description of a certain number of nonlimiting examples and with the aid of the accompanying drawing in which there can be seen:

FIGURE 5 is a front view of a package coded by means of dents on its upper surface.

FIGURE 6A is a cross sectional vertical view of an oven according to the invention where the heating element is an infra-red ray emitter.

FIGURE 6B is a view of a feeler actuated by a coding dent.

Figure 1:
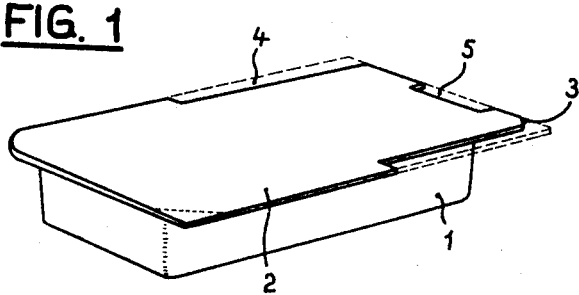
FIGURE 1 is a perspective of a package coded by means of indentations on its edges.

The coded package shown in FIGURE 1 comprises a bottom 1 and a cover 2. The edges of the cover are coded in a manner which represents the produce contained in the package. The depth of the indentation 4 determines the time of exposure of the package to heating. If, for example, high frequency induction is involved, the depth of the indentation 4 determines the time during which the package will be subjected to flux. The other indentations 3 and 5 can, for example, determine the intensity of heating and permit the control of other apparatus coupled with the present device.

Figure 2:
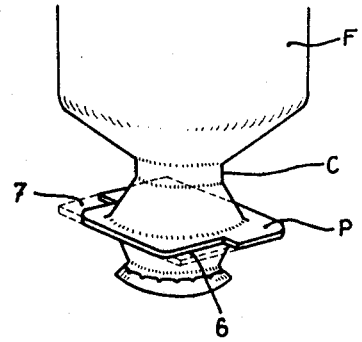
FIGURE 2 is a perspective of the spigot of a vessel provided with a plate thus indented.
Figure 3:
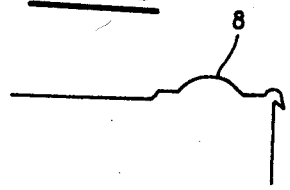
FIGURES 3 and 4 are differential sculptured views of a surface for a normal package (FIG. 3) and for a coded package (FIG. 4).
Figure 4:
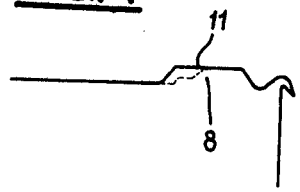

Vessel F, shown in FIGURE 2, is provided on its neck C with a plate P which has two nicks 6 and 7 therein and the nicks can either adjust the time during which the vessel will be subjected to heat treatment or modify information coming from the device to ensure the opening, the total or partial draining, and the closing of vessel F according to the product being heated. There has been shown in FIGURES 3, 4 and 5 various packages coded by indentation on their surfaces. Almost all cans in use today have projections 8 intended to compensate for deformations due to the partial vacuum created in the can after sterilization. However by selectively deforming the sheet of metal, the can may be coded by indentations 9, 10, 11, etc. These indentations are preferably made along straight lines on one and/or the other side of the can.

In FIGURE 6A, can be seen a package 12 introduced in an oven and resting on a support 13, which is positioned between two infra-red emitting elements 14 and 15 for example under ceramic and which possess high emission capacity. The oven has a shell 16 and is preferably thermally insulated by a mantel 17 of an insulating material such as glass wool. Package 12 is introduced through an insulated door 18 which is integral with a pressure blade or rod 19 which maintains the can 12 in position when the door 18 is closed. Electric conductors 20 and 21 close the circuits of infra-red emitters 14 and 15.

Each indentation on package 12 is sensed by a feeler 22 which comprises an arm one of whose extremities 23 is movable in response to coming in contact with projections 9 and 10. The arm is pivoted around a shaft 24 and is constantly urged by tension spring 25 towards the can 12 whose surface coding it analyzes. The spring 25 is anchored to a cross piece 26 whose height is adjustable by means of a device having a variable stop 27 and the height is preset in such a way that the feeler is maintained in a normal rest position substantially counterbalancing the force of the spring, as enumerated upon below. The other extremity 28 of feeler 22 is equipped with an adjusting rod 29 provided with a bearing member 29' which exerts, when the feeler is in its rest position and not actuated by the code of the package, a constant downward force on a device 30. The device 30 is a reversing switch which mechanically closes an electric circuit when the downward force is removed. There can be seen, in FIGURE 6B, the position of the feeler 22 when it is in contact with the projection 9 and it can be seen that the bearing surface 28' no longer presses against the device 30. When placed in such a condition, the device 30 closes an electric circuit 31 which includes a resistor 32. Each feeler 22 actuates a corresponding resistor 32 and the resistors all have different ohmic values so that depending upon which feelers are actuated, different resistance values are placed in the timing circuit. In the normal position of the feelers 22, all the resistors are connected in parallel and when any feeler is actuated to lift up its corresponding bearing member 29', its reversing switch 30 is actuated to place the resistor 32 in series with the timing circuit. The timing circuit is a conventional electrical timing circuit which controls the time period in which an external circuit is to be closed as a function of the resistance and as various feelers are actuated in accordance with the code of the package, the time period during which the heating circuit is closed is accordingly controlled.

Figure 9:
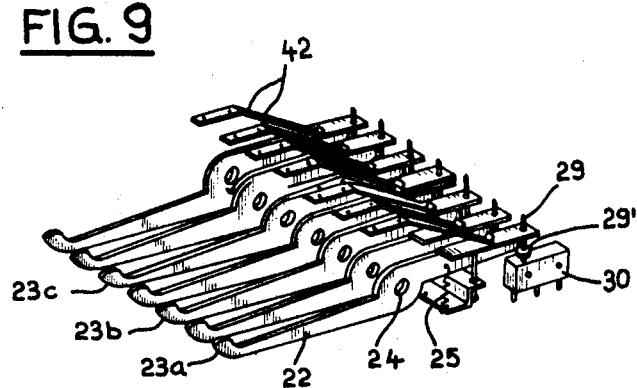
FIGURE 9 is a perspective view of a similar battery of feelers.

In FIGURE 9 is disclosed a battery of feelers 22 having sensing ends 23a, 23b and 23c. If a lightweight package were coded such that coding projections were present, when the package was inserted within the heating device, above all the feeler ends 23 at the same time, there may be insufficient package weight to actuate all the feelers. For example, if it takes a force of 1/7 pound to pivot each feeler 22, it would require a package weighing at least 1 pound before all seven feelers could simultaneously be pivoted. Hence, a package weighing only 1/2 pound would fail to pivot the seven feelers 22 in the above example. To compensate for this, the spring tension of spring 25 is adjusted by coordinately adjusting stop screw deviecs 27 and 43 and the adjusting rod 29 until the spring 25 very lightly biases the bearing member 29' against the reversing switch in its open position. Such an arrangement effectively counterbalances the feelers 22 so that they may be pivoted in response to a force many times less than would otherwise be possible. For example, if the counterbalancing rendered the feelers 8 times more sensitive, each feeler would be pivoted in response to a force of 1/56 pound rather than the otherwise threshold force of 1/7 pound.

Figure 8:
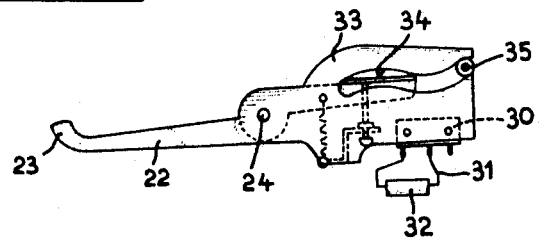
FIGURE 8 is a view of a side flange of a battery of feelers.

Two end flanges 33, one of which is seen in cross section in FIGURE 8, contain the package support 13 therebetween and are mounted for pivotal movement around shaft 24. Each flange 33 has a slot 34 in which can slide a small roller 35 which is connected to an arm 36. The arms 36, one for each flange 33, are urged against a shaft 38 and hence against the cranks 37 by a spring 40. The cranks 37 are themselves connected by a transverse bar 39 and the cranks support the weight of the can 12 as it is inserted, and the force exerted by the can as it is inserted in the direction W returns the crank 37 to the right, as viewed in FIG. 8. The particular shape of the slot 34 in which roller 35 slides makes it possible for the feelers 22 to lower when the can passes above them and to return to their normal rest position in which they touch the surface of the bottom of the can when it is in stop position.

Arms 36 are constantly urged in the direction opposite to arrow W by elastic members 40, such as a spring blade, in order that at the end of the operation when the oven door 18 (FIGURE 6) opens, the can 12 may be pushed out of the oven by the leftward movement of the cranks. Groove 41 serves as a guide for the movement of bar 39 in the direction of arrow W. When the oven door is closed, the pressure blade or rod 19 maintains the can 12 in the back (the right as viewed in FIG. 6A of the oven and such forces the cranks 37 to the right and preloads the spring 40.

To cross piece 26' is secured a number of flexible members 42 adjusted by means of the stop screw device 43 which exerts a pressure on the end 28 of feelers 22 and thereby urge the head 29' against the device 30 when the assembly of flanges 33 rocks to retract the feelers upon passage of a can.

At the start of use, the supply of electric current to the apparatus is controlled by a switch which has a temporary contact which closes the electric circuits. The temporary contact causes the closing of an electromagnetic relay (not shown) which energizes the timing circuit to effectively pre-heat the oven and causes energization of the circuit heating elements.

The pre-heating time is of the order of 5 minutes. At the end of a predetermined time period, the electromagnetic relay is deenergized and such deenergization of the relay is used to energize a pilot lamp which tells the user that the oven is ready.

Figure 7:
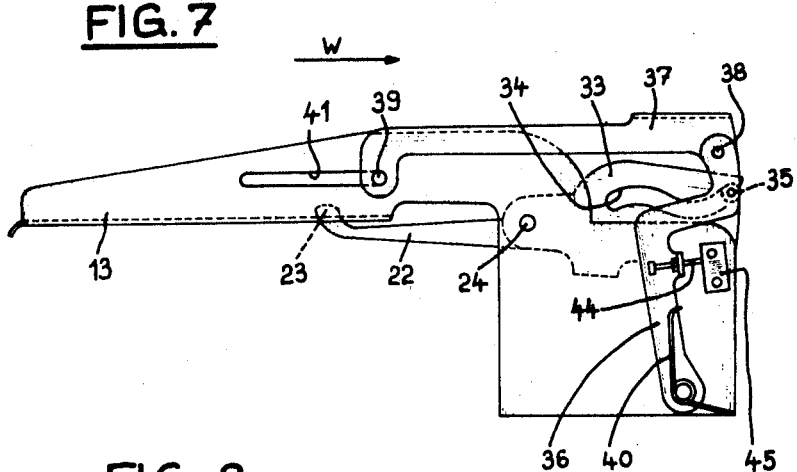
FIGURE 7 is a view of the device for closing the complete timing circuit.

After the coded package is inserted in the oven, the oven door is closed which initiates the supply of electric current to the timing circuit by means of the arm 36 and a rod 44 actuating a second switch 45 as seen in FIG. 7. As the can 12 is inserted in the oven, the feelers lower to pass thereunder. Before complete closure of the oven door, some of them have been moved by the coded projections on the can this putting into the electric timing circuit a certain ohmic value as indicated above.

Simultaneously with the supplying of electric current to the timing circuit, the heating elements are placed under voltage in parallel and an electro-magnet (not shown), which is connected through suitable linkage to lock the door, is placed under direct tension. When the electric current is shut off at the end of the heating period, the electro-magnet is accordingly deenergized, thereby unlocking the door, and the door opens due to expansion of the preloaded spring 40 which causes cranks 37 to move to the left as hereinbefore described.

Figure 10:
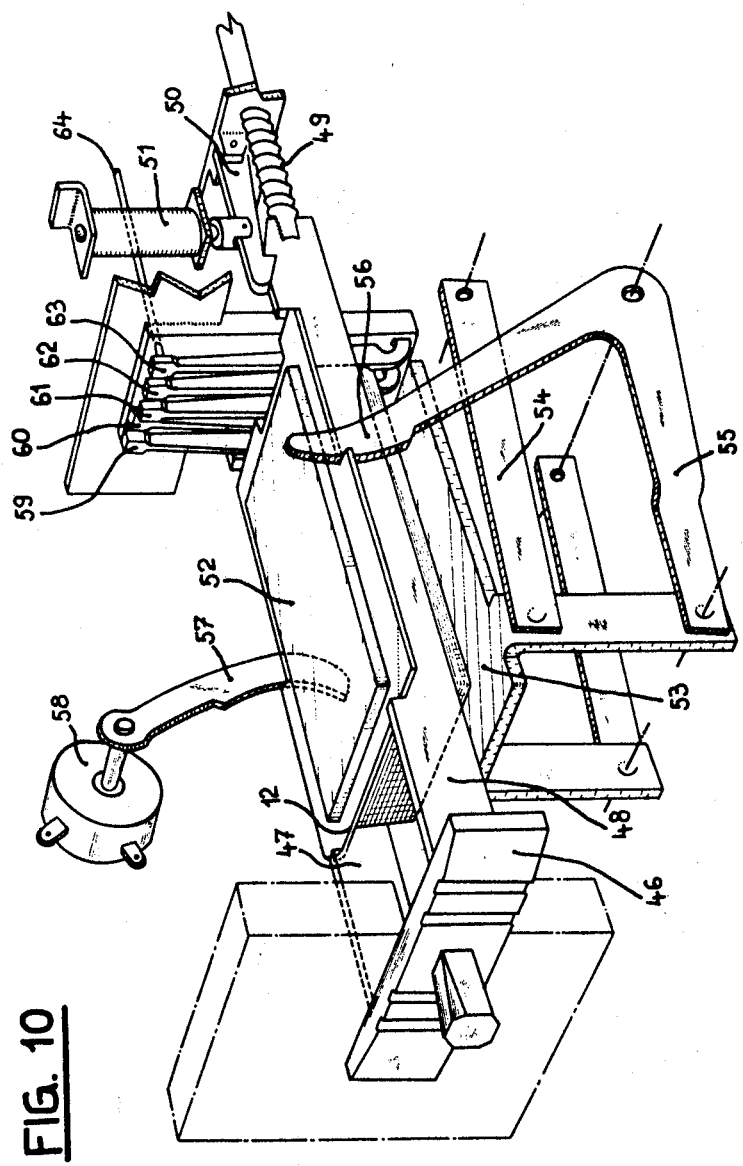
FIGURE 10 is a perspective view of a device according to the invention and of the adjusting members of a heating element having high frequency electrodes.

The device in FIG. 10 permits either direct heating of the food contained in the food package or allows the food to be prepared in the device itself, the device being coupled with appropriate apparatus for making the food. A drawer 46 interconnects two slides 47 and 48. These slides slide on two soles. Their end is provided with compression springs 49 which allow the drawer to open when pawl 50 is withdrawn by electro-magnet 51.

A high frequency electrode 52 is secured above the slides. A second electrode 53 can move up and down with a parallelogrammic harness constituted by driving rods 54 and 55. The end 56 forms a feeler and actuates the system. Another feeler 57 is integral with the shaft of a small rheostat 58.

A set of feelers 59, 60, 61, 62 and 63 pivot on their base and actuate rods 64, only one of which has been shown. These rods control the inverser contacts preferably placed outside the high frequency field and more particularly outside the Faraday cage protecting these electrodes. For the same reason, the feeler members are preferably constructed out of plastic material.

When the drawer 46 is opened, the coded package 12 is placed in the nicks with which are provided slides 47 and 48. The electrode 52, placed above the package prevents the drawer from closing if the latter is incorrectly positioned. As soon as the drawer has been fully closed, the pawl 50 falls in the nick provided for this purpose in slide 48, electro-magnet 51 being no longer energized.

Feeler 56 has moved, during the introduction of the drawer, a distance defined by the depth of a nick which will be referred to as nick 3 by analogy with FIG. 1 by supposing that there is involved a package of this type. By so moving it has moved electrode 53 so as to place it at a suitable distance from the electrode 52 and such distance determines the density of the electro-magnetic flux to which the package 12 is subjected.

Simultaneously, feeler 57 has moved a definite angle through the depth of a nick 4, again referring to the nick 4 shown in FIG. 1, and accordingly adjusts rheostat 58 and thereby the current time. Feelers 61, 62 and 63 have remained stationary in nick 5. On the contrary, feelers 59 and 60 have moved. This modification of the relative position of the feelers of series 59, 60, 61, 62 and 63 can put in series various resistances of a circuit which is external to the heating device itself. For example, they can adjust the cooking time of a device for making pancakes coupled with a heating device according to the present invention and associated with a vessel such as that shown in FIG. 2 which will modify the programming thus given to it by the device according to the present invention and according to the dough that it contains.

Figure 11:
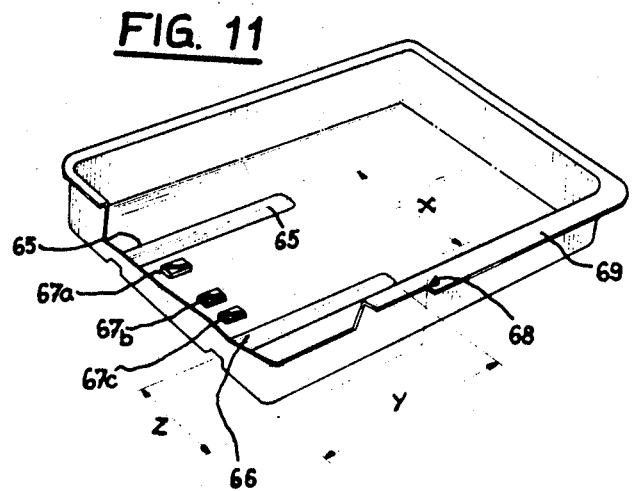
FIGURE 11 is a perspective view of a specially coded package.
Figure 12:
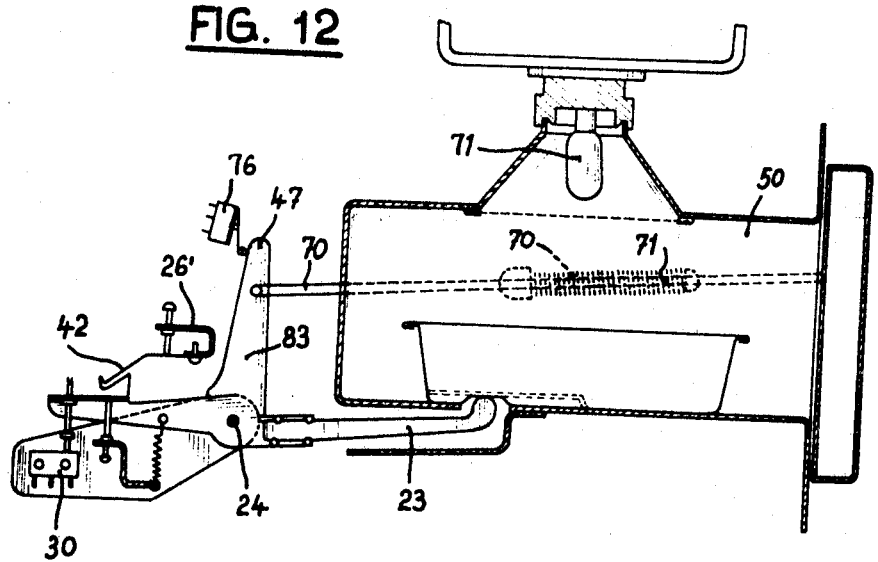
FIGURE 12 is a view in a generally vertical cross section of a device according to the invention where the heating element is constituted by a high frequency emitter emitting an electro-magnetic flux in a cavity.

Referring finally to FIGURE 11, there can be seen the bottom of a package of cardboard or plastic material having two longitudinal deformations 65 and 66, the spacing of which X corresponds to the width of the smallest package used in the food product field. Length Y of these grooves is such that it corresponds also to the length of the smallest package. Thus all formats which are variable in the case of cardboard or plastic packages can receive the imprint of these two grooves. These grooves guide the package during its introduction in the cavity of a high frequency oven, another type of heating to which can be adapted the present invention and which is of interest because it places into play a large cavity to cook large packages. Bosses 67a, 67b and 67c are disposed in hollow in the bottom of the package and constitute the coding. In a case where the adjustment of intensity or frequency must be resorted to in addition to the time adjustment, it is possible to dispose of one of the sides at a same distance Z for all packages in stop 68 formed by cutting out the horizontal flap 69 of the bottom flap intended for securing the cover of said package. This stop can actuate a lever made of a material inert to electromagnetic effects mechanically connected either to a rheostat or to a potentiometer in a resistance circuit or to a switch modifying the circuit. The bosses ensure the same functions of the bosses or the indentations previously described in the packages according to the invention. In FIG. 12, the ejection mechanisms are identical to those described in the device which uses an infra-red emitter. Instead of being operated by the package itself, however, flanges 83 analogous to flanges 33, are actuated in the present case by a rod 70 bearing inside the door of the oven. This rod is permanently urged by a compression spring 71 to the left to open the oven door. It is controlled by an electro-magnet (not shown) which ensures the closing of door against the urging of spring 71 during cooking. When the door of the oven is open in order to load the oven, rod 70 urged by spring 71 causes the assembly of flanges 83 and their feelers to rock and retract to allow the package to pass.

What is claimed is:

1. A device for heating coded articles, comprising; means defining a heating chamber, electrically actuated heating means for heating said heating chamber, an electric switch having a normally open position for breaking an electrical connection between said electrically actuated heating means and both an electric heating circuit and an electric timing circuit and having an actuated closed position for making an electrical connection between said electrically actuated heating means and both said electric heating and electric timing circuits, and feeler means automatically set by the articles for actuating said electric switch in response to contacting coded indicia on the articles to be heated when the articles are placed within said heating chamber.

2. A device according to claim 1, including a plurality of electric switches, and a similar number of feeler means each positioned to actuate one of said electric switches.

3. A device according to claim 2, wherein each of said feeler means comprises a pivotally mounted lever having two end portions, means disposed on one of said end portions for actuating said electric switch in response to pivotal movement of said lever in a given direction, and means disposed on the other of said end portions for contacting the coded indicia on the articles when the articles are placed within said heating chamber for pivoting said lever in said given direction.

4. A device according to claim 3, including spring means for biasing each of said levers in a direction opposite to said given direction whereby said electric switches are normally maintained in their normally open position.

5. A device according to claim 1, wherein said electrically actuated heating means comprises two high frequency electrodes.

6. A device according to claim 1, wherein said electrically actuated heating means comprises two infrared emitters.

7. A device according to claim 1, wherein said feeler means comprises a pivotally mounted lever having two end portions, means disposed on one of said end portions for actuating said electric switch in response to pivotal movement of said lever in a given direction, and means disposed on the other of said end portions for contacting the coded indicia on the articles when the articles are placed within said heating chamber for pivoting said lever in said given direction.

8. A device according to claim 7, including spring means for biasing said lever in a direction opposite to said given direction, whereby said electric switch is normally maintained in its normally open position.

9. A device according to claim 1, wherein said heating chamber has a slidable drawer disposed therein, and means supporting said drawer for slidable movement into and out of said heating chamber.

10. A device according to claim 9, further including locking means having a locked position for locking said drawer in said heating chamber and an unlocked position, and ejecting means for ejecting said drawer from said heating chamber when said locking means is in its unlocked position.

References Cited
UNITED STATES PATENTS

| 2,155,425 | 4/1939 | La Mere | 219—518 XR |
| 2,516,503 | 7/1950 | Bock | 219—518 XR |
| 3,031,558 | 4/1962 | Euler. | |
| 3,182,166 | 5/1965 | Bohm et al. | |
| 3,218,957 | 11/1965 | Fernell | 99—327 |
| 3,259,056 | 7/1966 | King | 99—333 XR |
| 3,289,570 | 12/1966 | Smith | 99—335 XR |
| 3,301,169 | 1/1967 | Young | 99—327 |
| 3,330,203 | 7/1967 | Korr | 99—332 |
| 3,363,080 | 1/1968 | Lamb et al. | 99—327 XR |
| 3,384,071 | 5/1968 | Body et al. | |

BILLY J. WILHITE, Primary Examiner

U.S. Cl. X.R.

99—1, 171, 334; 219—518